United States Patent
Chae et al.

(10) Patent No.: US 12,113,195 B2
(45) Date of Patent: Oct. 8, 2024

(54) DEVICE FOR PRODUCING NEGATIVE ELECTRODE AND METHOD OF PRODUCING NEGATIVE ELECTRODE

(71) Applicant: LG ENERGY SOLUTION, LTD., Seoul (KR)

(72) Inventors: Oh Byong Chae, Daejeon (KR); Ye Ri Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 65 days.

(21) Appl. No.: 17/611,756

(22) PCT Filed: May 7, 2020

(86) PCT No.: PCT/KR2020/006055
§ 371 (c)(1),
(2) Date: Nov. 16, 2021

(87) PCT Pub. No.: WO2020/235841
PCT Pub. Date: Nov. 26, 2020

(65) Prior Publication Data
US 2022/0231269 A1     Jul. 21, 2022

(30) Foreign Application Priority Data
May 17, 2019   (KR) .................. 10-2019-0057950

(51) Int. Cl.
*H01M 4/04*    (2006.01)
*H01M 4/139*   (2010.01)
(Continued)

(52) U.S. Cl.
CPC ....... *H01M 4/0459* (2013.01); *H01M 4/0416* (2013.01); *H01M 4/0445* (2013.01);
(Continued)

(58) Field of Classification Search
CPC .................................................. H01M 4/0459
See application file for complete search history.

(56) References Cited

U.S. PATENT DOCUMENTS

| 5,743,921 A | 4/1998 | Nazri et al. |
| 2004/0086587 A1 | 5/2004 | Meyer |

(Continued)

FOREIGN PATENT DOCUMENTS

| CN | 107546407 | * | 1/2018 |
| CN | 107548407 A | | 1/2018 |

(Continued)

OTHER PUBLICATIONS

Machine translation of KR 10-0806251 (original provided in IDS).*
(Continued)

*Primary Examiner* — Austin Murata
(74) *Attorney, Agent, or Firm* — Birch, Stewart, Kolasch & Birch, LLP

(57) ABSTRACT

A device for producing a negative electrode, which includes: a pre-lithiation bath containing a pre-lithiation solution, which is sequentially divided into an impregnation section, a pre-lithiation section, and an aging section; a negative electrode roll present outside the pre-lithiation solution, wherein the negative electrode roll is configured to allow a negative electrode structure to be wound and unwound; and one or more pre-lithiation rolls which are present inside the pre-lithiation solution, wherein the one or more pre-lithiation rolls allow the negative electrode structure unwound from the negative electrode roll to move in the pre-lithiation bath, wherein the pre-lithiation roll includes an inner ring, an outer ring which is formed on the inner ring and is rotatable, and a rolling element present between the inner ring and the outer ring, and the outer ring in the pre-lithiation roll comprises a non-conductor.

15 Claims, 2 Drawing Sheets

(51) Int. Cl.
 *H01M 10/0525* (2010.01)
 *H01M 4/02* (2006.01)

(52) U.S. Cl.
 CPC ....... *H01M 4/139* (2013.01); *H01M 10/0525* (2013.01); *H01M 2004/027* (2013.01)

(56) References Cited

U.S. PATENT DOCUMENTS

| | | | |
|---|---|---|---|
| 2004/0192528 A1* | 9/2004 | Fukase | G03G 15/2057 492/53 |
| 2009/0252448 A1* | 10/2009 | Ozu | F16C 33/3706 384/551 |
| 2010/0054821 A1 | 3/2010 | Jung et al. | |
| 2012/0048739 A1 | 3/2012 | Choi et al. | |
| 2012/0288749 A1* | 11/2012 | Kim | H01M 4/0435 429/185 |
| 2013/0327648 A1 | 12/2013 | Grant et al. | |
| 2015/0191841 A1* | 7/2015 | Grant | H01M 4/139 205/59 |
| 2016/0141596 A1 | 5/2016 | Uhm et al. | |
| 2016/0229653 A1* | 8/2016 | Shoji | B08B 1/04 |
| 2019/0109322 A1 | 4/2019 | Grant et al. | |
| 2021/0135274 A1 | 5/2021 | Chae et al. | |

FOREIGN PATENT DOCUMENTS

| | | |
|---|---|---|
| CN | 109103498 A | 12/2018 |
| EP | 2 786 441 A1 | 10/2014 |
| JP | 9-22690 A | 1/1997 |
| JP | 10-12224 A | 1/1998 |
| JP | 2004-66824 A | 3/2004 |
| KR | 10-0291067 B1 | 6/2001 |
| KR | 10-0806251 * | 3/2008 |
| KR | 10-0806251 B1 | 3/2008 |
| KR | 10-1204539 B1 | 11/2012 |
| KR | 10-2015-0014676 A | 2/2015 |
| KR | 10-1499568 B1 | 3/2015 |
| KR | 10-1771122 B1 | 9/2017 |
| KR | 10-2018-0061671 A | 6/2018 |
| KR | 10-2018-0112659 A | 10/2018 |
| WO | WO 2013/082330 A1 | 6/2013 |

OTHER PUBLICATIONS

Machine translation of document N (previously provided Apr. 20, 2023).*
Machine translation of document N.*
Extended European Search Report for European Application No. 20809469.8, dated May 20, 2022.
International Search Report for PCT/KR2020/006055 mailed on Aug. 12, 2020.

* cited by examiner

[FIG. 1]
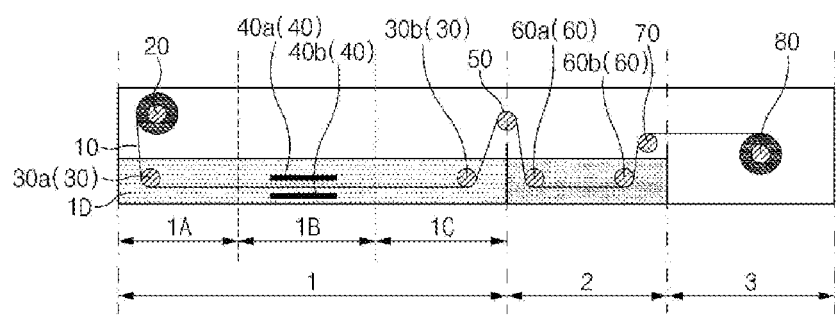
[FIG. 2]
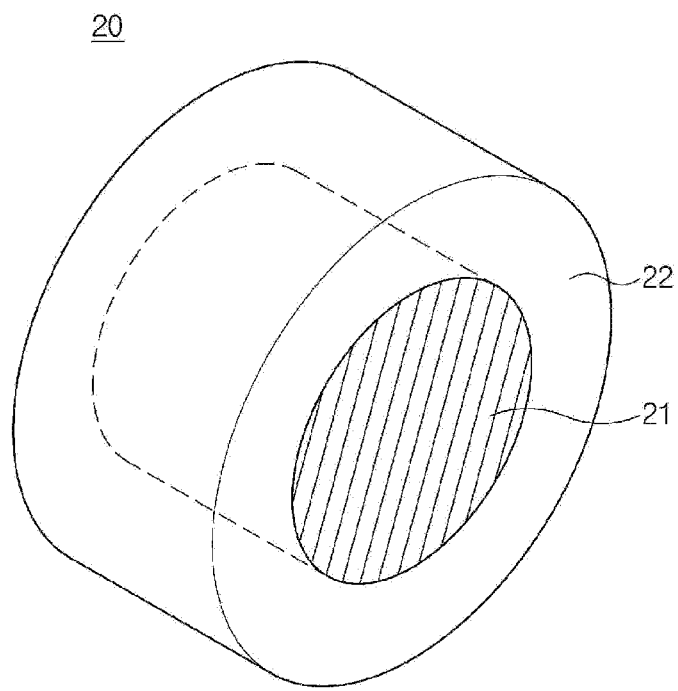

[FIG. 3]
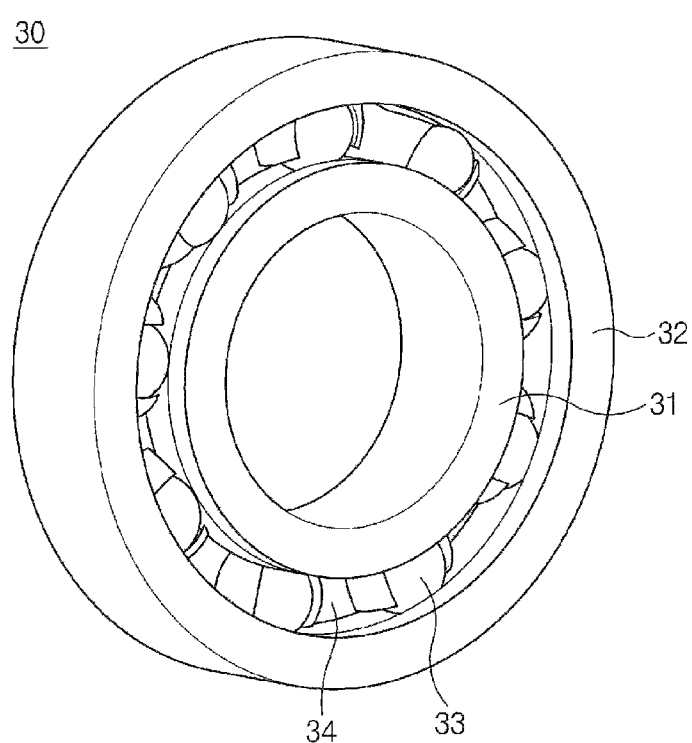

DEVICE FOR PRODUCING NEGATIVE ELECTRODE AND METHOD OF PRODUCING NEGATIVE ELECTRODE

CROSS-REFERENCE TO RELATED APPLICATION

This application claims priority to and the benefit of Korean Patent Application No. 10-2019-0057950, filed on May 17, 2019, the disclosure of which is incorporated herein by reference in its entirety.

TECHNICAL FIELD

The present invention relates to a device for producing a negative electrode and a method of producing a negative electrode.

BACKGROUND Art

Recently, in response to the rapid spread of electronic devices using batteries, such as mobile phones, notebook computers, and electric vehicles, demand for secondary batteries having a small size, a light weight, and relatively high capacity is rapidly increasing. In particular, lithium secondary batteries have been in the spotlight as a driving power source for portable devices due to having a light weight and high energy density. Accordingly, research and development efforts for improving the performance of lithium secondary batteries have been continuously made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$, $LiMn_2O_4$, or the like is used as a positive electrode active material in the positive electrode, and a carbon-based material or a silicon-based material which does not contain lithium is used as a negative electrode active material in the negative electrode.

In the case of such a negative electrode, a passivation film such as a solid electrolyte interface layer (SEI layer) is formed on the surface of the negative electrode during initial charging. Since the passivation film interferes with the insertion of an organic solvent into the negative electrode and suppresses the decomposition reaction of an organic solvent, the aging of the negative electrode structure, and the reversibility of the negative electrode is improved, and the negative electrode structure enables its use in the negative electrode. However, the formation reaction of the passivation film, which is an irreversible reaction, leads to the consumption of lithium ions, resulting in reduced battery capacity, and as lithium ions are consumed while the battery cycle of the battery is repeated, capacity and cycle life are degraded.

Accordingly, a method of pre-lithiating a negative electrode by intercalating lithium into the negative electrode to promote the pre-formation of a passivation film on the surface of the negative electrode, the prevention of capacity degradation, and the improvement of cycle life has been developed.

As examples of the pre-lithiation method, a method of diffusing lithium into a negative electrode structure by bringing a negative electrode structure and a lithium metal in contact, a method of introducing a negative electrode structure into a lithium salt-containing bath and electrochemically charging the negative electrode structure using a lithium metal as a counter electrode, and the like are known.

Meanwhile, a method of pre-lithiating a negative electrode structure at one time by applying the above-described pre-lithiation in the electrochemical charging manner to a roll-to-roll process is also considered. The pre-lithiation using the roll-to-roll process can be performed by electrochemically charging a negative electrode structure while moving the same in a reaction bath using a roll structure.

In this case, the roll structure used in the roll-to-roll process is conventionally made of materials such as stainless steel, iron, copper, aluminum, and the like in consideration of stiffness, durability, and the like. However, since these materials are conductive materials, when the roll structure including the material is applied in the pre-lithiation process, the current to be used to intercalate lithium into a negative electrode structure at least partially flows outward and is thus consumed due to the conductive materials, and accordingly, there is a problem in which process loss occurs and it is difficult to stably perform pre-lithiation and control the degree of pre-lithiation of a negative electrode structure.

Korean Registered Patent No. 10-0291067 discloses a method of pre-lithiating a carbon electrode and a method of producing a lithium secondary battery using the same.

PRIOR-ART DOCUMENTS

Patent Documents

Korean Registered Patent No. 10-0291067

DISCLOSURE

Technical Problem

The present invention is directed to providing a device for producing a negative electrode, which is capable of preventing current loss to the outside and uniformly and stably controlling the degree of pre-lithiation by including a non-conductor in an outer ring of a roll structure which allows a negative electrode structure to be conveyed and move in the pre-lithiation of a negative electrode in a roll-to-roll manner, as compared with when a conductive material is used in the outer ring of the roll structure.

The present invention is also directed to providing a method of producing a negative electrode, which uses the above-described device for producing a negative electrode.

Technical Solution

One aspect of the present invention provides a device for producing a negative electrode, which includes: a pre-lithiation bath comprising a pre-lithiation solution, which is sequentially divided into an impregnation section, a pre-lithiation section, and an aging section; a negative electrode roll which is disposed outside the pre-lithiation solution, wherein the negative electrode roll is configured to allow a negative electrode structure to be wound and unwound; and one or more pre-lithiation rolls which are disposed inside the pre-lithiation solution, wherein the one or more pre-lithiation rolls allow the negative electrode structure unwound from the negative electrode roll to move in the pre-lithiation bath, wherein the pre-lithiation roll comprises an inner ring, an outer ring which is formed on the inner ring and is rotatable, and a rolling element which is disposed between the inner ring and the outer ring, and the outer ring included in the pre-lithiation roll comprises a non-conductor.

Another aspect of the present invention provides a method of producing a negative electrode, which includes: providing the above-described device for producing the negative electrode; winding the negative electrode structure around the negative electrode roll; impregnating the negative electrode structure with the pre-lithiation solution while unwinding the negative electrode structure from the negative electrode roll and moving the same through the impregnation section; pre-lithiating the negative electrode structure while moving the negative electrode structure from the impregnation section through the pre-lithiation section; and aging the negative electrode structure while moving the negative electrode structure from the pre-lithiation section through the aging section, wherein the pre-lithiation is performed by placing a lithium metal counter electrode, which is spaced apart from the negative electrode structure and impregnated with the pre-lithiation solution, in the pre-lithiation section and electrochemically charging the negative electrode structure, and the negative electrode structure moves through the impregnation section, the pre-lithiation section, and the aging section by the pre-lithiation roll.

Advantageous Effects

A device for producing a negative electrode according to the present invention can allow a negative electrode to be pre-lithiated in a roll-to-roll manner and can prevent current loss to the outside and uniformly and stably control the degree of pre-lithiation by including a non-conductor in an outer ring of a roll structure which allows a negative electrode structure to be conveyed and move in the pre-lithiation, as compared with when a conductive material is used in the outer ring.

Therefore, when a negative electrode is produced using the above-described device for producing a negative electrode, lithium ions can be uniformly and stably diffused into the negative electrode structure without process loss, and the formation of a uniform passivation film on the negative electrode and the improvement of lifetime characteristics of the negative electrode can be promoted.

DESCRIPTION OF DRAWINGS

FIG. 1 is a schematic diagram for describing a device for producing a negative electrode according to the present invention.

FIG. 2 is a schematic diagram for describing the structure of a negative electrode roll.

FIG. 3 is a schematic diagram for describing the structure of a pre-lithiation roll.

MODES OF THE INVENTION

Terms and words used in this specification and the claims should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing particular embodiments, and is not intended to be limiting of the present invention. The singular forms "a," "an," and "the" are intended to include the plural forms as well, unless the context clearly indicates otherwise.

It should be understood that the terms "comprising," "including," and/or "having," when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured using, for example, a laser diffraction method. The laser diffraction method generally allows the measurement of a particle diameter ranging from a submicron level to several millimeters and may produce a result having high reproducibility and high resolution.

Hereinafter, the present invention will be described in detail.

Device for Producing Negative Electrode

The present invention provides a device for producing a negative electrode, specifically, a device for producing a negative electrode for a lithium secondary battery.

The device for producing a negative electrode according to the present invention may be a device that enables the production of a negative electrode by pre-lithiating a negative electrode structure, for example, through electrochemical charging and may also be a device for producing a negative electrode by a roll-to-roll process.

The device for producing a negative electrode according to the present invention includes: a pre-lithiation bath containing a pre-lithiation solution, which is sequentially divided into an impregnation section, a pre-lithiation section, and an aging section; a negative electrode roll present outside the pre-lithiation solution, wherein the negative electrode roll is configured to allow a negative electrode structure to be wound and unwound; and one or more pre-lithiation rolls which are present inside the pre-lithiation solution, wherein the one or more pre-lithiation rolls allow the negative electrode structure unwound from the negative electrode roll to move in the pre-lithiation bath, wherein the pre-lithiation roll includes an inner ring, an outer ring which is formed on the inner ring and is rotatable, and a rolling element present between the inner ring and the outer ring, and the outer ring included in the pre-lithiation roll includes a non-conductor.

The device for producing a negative electrode according to the present invention is fabricated in a way so that a non-conductor is included in the outer ring of the pre-lithiation roll which allows the negative electrode structure to be conveyed to/move in the reaction bath. Since the outer ring of the pre-lithiation roll includes a non-conductor, the current applied to the negative electrode structure when pre-lithiation is performed by electrochemical charging may not flow out through the outer ring but may be mainly used in the pre-lithiation of the negative electrode structure or the intercalation of lithium. Therefore, the device for producing a negative electrode according to the present invention achieves remarkably low process loss in the electrochemical charging and enables uniform and stable pre-lithiation of the negative electrode structure, resulting in improvement of lifetime characteristics of the produced negative electrode.

Hereinafter, the device for producing a negative electrode according to the present invention will be described in detail with reference to the accompanying drawings. In giving reference numerals to components of the drawings, it should be noted that the same components have the same reference numerals as much as possible although being shown in different drawings. Further, in the description of embodiments of the present invention, a detailed description of known functions and configurations incorporated herein will be omitted to avoid making the subject matter of the present invention unclear.

FIG. 1 is a schematic diagram for describing the device for producing a negative electrode according to the present invention. FIG. 2 is a schematic diagram for describing the structure of the negative electrode roll. FIG. 3 is a schematic diagram for describing the structure of the pre-lithiation roll.

Referring to FIG. 1, the device for producing a negative electrode according to the present invention includes a pre-lithiation bath 1 which is sequentially divided into an impregnation section 1A, a pre-lithiation section 1B, and an aging section 1C and contains a pre-lithiation solution 1D.

The pre-lithiation bath 1 may be provided as a place where a negative electrode structure to be described below may be impregnated with an electrolyte solution, pre-lithiated, and aged while moving in the pre-lithiation bath.

The pre-lithiation bath 1 is sequentially divided into the impregnation section 1A, the pre-lithiation section 1B, and the aging section 1C. The impregnation section 1A, the pre-lithiation section 1B, and the aging section 1C are not partitioned in a closed manner in the pre-lithiation bath 1 but abstractly partitioned according to the position of a negative electrode or a negative electrode structure in the pre-lithiation bath 1 and the process performed at the position of the negative electrode structure. For example, as shown in FIG. 1, the impregnation section 1A, the pre-lithiation section 1B, and the aging section 1C are abstractly partitioned through a dotted line in the pre-lithiation bath 1.

The pre-lithiation bath 1 contains the pre-lithiation solution 1D. The pre-lithiation bath 1 is at least partially filled with the pre-lithiation solution 1D, and a negative electrode structure 10 unwound from a negative electrode roll 20 is introduced into the pre-lithiation solution 1D and moves through the sections of the pre-lithiation bath 1.

As the pre-lithiation bath 1 contains the pre-lithiation solution 1D, the pre-lithiation solution 1D is also contained in the impregnation section 1A, the pre-lithiation section 1B, and the aging section 1C which are partitioned in the pre-lithiation bath 1.

The pre-lithiation solution 1D may include a lithium salt and an organic solvent.

The organic solvent is not particularly limited as long as it may serve as a medium through which ions involved in an electrochemical reaction can migrate. Specifically, as the organic solvent, an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), methyl ethyl carbonate (MEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane may be used. Among those listed above, a carbonate-based solvent is preferred, and EMC, EC, or the like is more preferred in view of improving electrochemical stability.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$. LiCl, LiI, and $LiB(C_2O_4)_2$ and preferably includes $LiPF_6$.

A concentration of the lithium salt may range from 0.1 M to 3 M, and preferably, 0.5 M to 1.5 M based on the pre-lithiation solution, and it is preferable that the concentration of the lithium salt is within the above-described range so that the lithium salt can be sufficiently dissolved so that lithium ions can be smoothly intercalated into an active material.

In view of stabilizing the surface of a negative electrode active material to smoothly perform pre-lithiation, the pre-lithiation solution 1D may further include at least one additive selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI) and preferably further includes FEC.

The additive may be included at 0.1 wt % to 15 wt %, and preferably, 0.5 wt % to 5 wt % with respect to the total weight of the pre-lithiation solution in the pre-lithiation solution in view of stabilizing the surface of a negative electrode active material to smoothly perform pre-lithiation.

The size and shape of the pre-lithiation bath 1 may be appropriately designed in consideration of the degrees of the impregnation, pre-lithiation, and aging of a negative electrode structure and the movement distance of a negative electrode structure according to roll-to-roll processing, or the like.

The size or length of the impregnation section 1A, the pre-lithiation section 1B, and the aging section 1C may be appropriately designed in consideration of the degrees of electrolyte impregnation, pre-lithiation, and aging of the negative electrode structure 10. Specifically, the ratio of lengths of the impregnation section 1A, the pre-lithiation section 1B, and the aging section 1C is 1 to 10:1:0.5 to 21, and preferably, 1.5 to 5:1:1.8 to 10 for smoothly performing pre-lithiation.

A temperature of the pre-lithiation bath 1 or the pre-lithiation solution 1D may range from 10° C. to 80° C., preferably 20° C. to 60° C. When the temperature thereof is within the above-described range, the pre-lithiation of a negative electrode and the diffusion of lithium ions into the negative electrode structure can smoothly proceed.

The device for producing a negative electrode according to the present invention may further include a lithium metal counter electrode 40 which is disposed in the pre-lithiation section 1B and impregnated with the pre-lithiation solution 1D. The lithium metal counter electrode 40 may be disposed to be spaced apart from the negative electrode structure 10 and function as a counter electrode for the negative electrode structure 10 when the pre-lithiation is performed in an electrochemical charging manner in the device for producing a negative electrode.

At least one lithium metal counter electrode 40 may be disposed to be spaced apart from the negative electrode structure 10 in the pre-lithiation section 1B, and as shown in FIG. 1, a plurality of lithium metal counter electrodes 40a, 40b may be disposed in the pre-lithiation section 1B.

The device for producing a negative electrode includes a negative electrode roll 20.

As shown in FIG. 1, the negative electrode roll 20 may be disposed outside the pre-lithiation solution 1D and allow the negative electrode structure to be wound and unwound. For example, the negative electrode structure 10 may be provided in a wound state on the negative electrode roll 20 and then introduced into the pre-lithiation bath 1 or the pre-lithiation solution 1D while being unwound from the negative electrode roll 20.

FIG. 2 is a schematic diagram of the structure of the negative electrode roll 20 that can be used in the present invention. Referring to FIG. 2, the negative electrode roll 20 may include a rotatable drive shaft 21 and a winding portion 22 which is formed on the rotatable drive shaft 21 and on which the negative electrode structure 10 is wound, and from which the negative electrode structure 10 is unwound, and the winding portion 22 may include a non-conductor.

The drive shaft 21 is rotatable, and, as the drive shaft 21 is rotated, the negative electrode structure 10 may be wound on or unwound from the winding portion 22. The drive shaft 21 may be connected to an electric motor and rotated by driving the electric motor.

The drive shaft 21 may include one or more selected from the group consisting of iron, stainless steel, aluminum, and copper and preferably includes stainless steel in view of improving strength and durability.

The winding portion 22 may be formed on the drive shaft 21, and the negative electrode structure 10 may be wound on and unwound from the winding portion 22. The winding portion 22 may be formed in the form of a layer on the drive shaft 21, and the negative electrode structure 10 may be wound on and unwound from the surface of the winding portion 22.

The winding portion 22 may include a non-conductor. The winding portion 22 may be a portion with which the negative electrode structure to be wound is in direct contact. In this case, since the winding portion 22 includes a non-conductor, electrical insulation may be achieved between the negative electrode structure 10 and the drive shaft 21. Specifically, an electric motor may be used to rotate the drive shaft 21, and current may flow outward by driving the electric motor. In this case, when the winding portion 22 includes a non-conductor, unwanted side reactions in the negative electrode structure, which is caused by transferring the current generated from the electric motor from the drive shaft to the negative electrode structure, may be prevented.

Specifically, the winding portion 22 may include at least one non-conductor selected from the group consisting of $ZrO_2$, $TiO_2$, $Al_2O_3$, $SiO_2$, polyethylene, polypropylene, polyvinyl chloride, polyether ether ketone (PEEK), polysiloxane (silicone), fluorine-containing rubber, nitrile-butadiene rubber (NBR), polytetrafluoroethylene (PTFE), and polyether ether ketone (PEEK) for electrical insulation between the drive shaft 21 and the negative electrode structure 10 and preferably includes polysiloxane in view of achieving excellent binding power to the negative electrode structure as well as insulation.

The winding portion 22 may have a thickness of 0.1 cm to 2 cm, and preferably, 0.4 cm to 0.7 cm in view of making it easier to bind the negative electrode structure and achieve insulation.

The diameter or width of the negative electrode roll 20 may be appropriately designed in consideration of the thickness and amount of the negative electrode structure to be wound. For example, the negative electrode roll 20 may have a diameter of 3 cm to 50 cm, and preferably, 5 cm to 12 cm. In addition, the negative electrode roll 20 may have a width of 5 cm to 40 cm, and preferably, 10 cm to 20 cm.

The device for producing a negative electrode includes one or more pre-lithiation rolls.

A pre-lithiation roll 30 may be disposed inside the pre-lithiation solution and allow the negative electrode structure 10 unwound from the negative electrode roll 20 to be conveyed to or move in the pre-lithiation bath. At least one pre-lithiation roll 30 may be disposed, and for example, a plurality of pre-lithiation rolls 30a, 30b may be disposed inside the pre-lithiation solution as shown in FIG. 1. The plurality of pre-lithiation rolls 30a, 30b may function to support the movement path of the negative electrode structure 10 or change the movement direction thereof.

In addition, as shown in FIG. 3, the pre-lithiation roll 30 includes an inner ring 31, an outer ring 32 which is formed on the inner ring and is rotatable, and a rolling element 33 which is disposed between the inner ring 31 and the outer ring 32. In addition, the outer ring 32 includes a non-conductor.

The inner ring 31 may function to support the rolling element 33 and/or the outer ring 32. Specifically, the inner ring 31 may be fixedly disposed inside the pre-lithiation solution 1D of the pre-lithiation bath 1 so as not to be rotatable.

The inner ring 31 may include one or more selected from the group consisting of iron, stainless steel, aluminum, and copper and preferably includes stainless steel in view of improving strength and durability.

The inner ring 31 may have a thickness of 0.2 cm to 1 cm, and preferably, 0.3 cm to 0.7 cm in view of sufficiently supporting the outer ring, the rolling element, the negative electrode structure, and the like.

The outer ring 32 is formed on the inner ring 31 and is rotatable. The outer ring 32 may be rotated independently of the inner ring 31 while being spaced a predetermined distance from the inner ring 31 by the rolling element 33 to be described below.

The outer ring 32 includes a non-conductor. The outer ring 32 provides a surface where the pre-lithiation roll 30 and the negative electrode structure 10 are in contact. When the outer ring 32 includes a non-conductor, the current applied to the negative electrode structure 10 when pre-lithiation is performed by electrochemical charging may not be consumed externally or wasted through the pre-lithiation roll 30. Accordingly, low process loss in the pre-lithiation by electrochemical charging is achieved, the negative electrode structure is uniformly and stably pre-lithiated, and the degree of pre-lithiation is easily controlled. Therefore, since a negative electrode produced using the device for producing a negative electrode according to the present invention is uniformly and stably pre-lithiated, battery characteristics such as lifetime characteristics and the like can be improved.

The non-conductor is preferably a material having electrical insulation and strength and, specifically, may include one or more selected from the group consisting of a ceramic compound and a non-conductive polymer.

The ceramic compound included in the outer ring 32 may be one or more metal oxide, wherein the metal is selected from the group consisting of silicon (Si), aluminum (Al), titanium (Ti), zirconium (Zr), calcium (Ca), magnesium (Mg), yttrium (Y), and cerium (Ce) in view of achieving high insulation and high strength, is preferably one or more selected from the group consisting of $ZrO_2$, $Al_2O_3$, $TiO_2$, and $SiO_2$ in view of achieving excellent stability with respect to the pre-lithiation solution 1D or an organic solvent as well as high insulation and strength, and is more preferably $ZrO_2$.

The non-conductive polymer included in the outer ring 32 may be one or more selected from the group consisting of polytetrafluoroethylene (PTFE), polyethylene, polypropylene, polyvinyl chloride, and polyether ether ketone (PEEK) in view of achieving high insulation and high strength, is preferably one or more selected from the group consisting of PTFE, polypropylene, and PEEK in view of achieving excellent stability with respect to the pre-lithiation solution 1D or an organic solvent as well as high insulation and strength, and is more preferably PEEK.

The outer ring 32 may have a thickness of 0.2 cm to 1 cm, and preferably, 0.4 cm to 0.7 cm in view of achieving excellent insulation as well as sufficient strength and durability.

The rolling element 33 may be disposed between the inner ring 31 and the outer ring 32 and operated or rotated. The outer ring 32 may be rotated by the operation or rotation of the rolling element 33.

The rolling element 33 may be used without limitation as long as it is a rolling element generally used in the roll structure and may be, for example, a rolling element in the form of a ball or a roller.

The pre-lithiation roll 30 may further include a cage 34 which is disposed between the inner ring 31 and the outer ring 32 and accommodates the rolling element 33. The cage 34 may function to allow the rolling element 33 to be disposed at a predetermined interval and position between the inner ring 31 and the outer ring 32 and prevent the rolling element 33 from being separated from the pre-lithiation roll.

The diameter or width of the pre-lithiation roll 30 may be appropriately designed in consideration of the thickness and amount of the negative electrode structure to be conveyed. For example, the pre-lithiation roll 30 may have a diameter of 1.5 cm to 25 cm, and preferably, 2.5 cm to 7.5 cm. In addition, the pre-lithiation roll 30 may have a width of 5 cm to 40 cm, and preferably, 10 cm to 20 cm.

As shown in FIG. 1, the device for producing a negative electrode according to the present invention may further include: a washing bath 2 containing an organic solvent; a first conveying roll 50 present between the pre-lithiation bath 1 and the washing bath 2, wherein the first conveying roll allows the negative electrode structure 10 to be conveyed from the pre-lithiation bath 1 to the washing bath 2; and at least one washing roll 60 present inside the organic solvent, wherein the one or more washing rolls allow the negative electrode structure 10 conveyed to the washing bath 2 to move in the washing bath 2.

The washing bath 2 may be disposed independently of the pre-lithiation bath 1 and provided as a place for washing the negative electrode structure 10 having been pre-lithiated. The negative electrode structure 10 is introduced into the washing bath 2 from the pre-lithiation bath 1 and moves through the washing bath 2, and accordingly, impurities remaining in the negative electrode structure may be removed.

The washing bath 2 contains the organic solvent, and specifically, may contain the organic solvent not containing a lithium salt. The negative electrode structure is washed while moving in the organic solvent not containing a lithium salt.

As the organic solvent, the organic solvent used in the pre-lithiation solution may be used, and, specifically, at least one selected from the group consisting of dimethyl carbonate (DMC), ethyl methyl carbonate (EMC), and ethylene carbonate (EC) may be used.

The length of the washing bath 2 or the movement distance of the negative electrode structure 10 in the washing bath 2 may be 0.1 times to 5 times, and preferably, 0.5 times to 2 times the length of the pre-lithiation section 1B. Within the above-described range, impurities remaining in the negative electrode structure can be smoothly removed.

The first conveying roll 50 may be disposed between the pre-lithiation bath 1 and the washing bath 2 and allow the negative electrode structure 10 to be conveyed from the pre-lithiation bath 1 to the washing bath 2.

The washing roll 60 may be disposed inside the organic solvent and allow the negative electrode structure 10 conveyed to the washing bath 2 through the first conveying roll 50 to move in the washing bath 2.

There may be at least one washing roll 60, and, for example, a plurality of washing rolls 60a, 60b may be disposed inside the organic solvent as shown in FIG. 1.

The first conveying roll 50 and the washing roll 60 may be identical to the pre-lithiation roll 30, which is preferred in view of achieving high strength and improving stability with respect to the organic solvent.

As shown in FIG. 1, the device for producing a negative electrode according to the present invention may further include: a drying part 3; a second conveying roll 70 present between the washing bath 2 and the drying part 3, wherein the second conveying roll allows the negative electrode structure 10 to be conveyed from the washing bath 2 to the drying part 3 and move in the drying part 3; and a collecting roll 80 which allows the negative electrode structure 10 conveyed to the drying part 3 to be wound and unwound.

The drying part 3 may be provided as a place for drying the negative electrode structure 10 having passed through the pre-lithiation bath 1 and the washing bath 2.

The drying part 3 contains air or an inert gas. The inert gas may be at least one selected from the group consisting of Ar, $N_2$, and He.

A temperature of the drying part 3 may range from 10° C. to 80° C., preferably 20° C. to 60° C., and more preferably 25° C. to 40° C. It is preferable that the temperature of the drying part is within the above-described range so that the negative electrode structure can be prevented from being oxidized and maintained in the pre-lithiated state.

The length of the drying part 3 or the movement distance of the negative electrode structure 10 in the drying part 3 may be 0.1 times to 5 times, and preferably, 0.5 times to 2 times the length of the pre-lithiation section 1B. It is preferable that the length of the drying part 3 or the movement distance of the negative electrode structure 10 in the drying part 3 is within the above-described range so that the organic solvent remaining in the negative electrode structure can be smoothly removed, and damage to the negative electrode structure which may be caused by the organic solvent remaining in the negative electrode structure for a long time can be prevented.

The second conveying roll 70 may be disposed between the washing bath 2 and the drying part 3 and allow the negative electrode structure 10 to be conveyed from the washing bath 2 to the drying part 3 and move in the drying part 3.

The collecting roll 80 may allow the negative electrode structure 10 conveyed to the drying part 3 to be wound and unwound. The collecting roll 80 may function to collect the negative electrode structure having been pre-lithiated, washed, and dried.

The second conveying roll 70 may be identical to the above-described pre-lithiation roll 30.

The collecting roll 80 may be identical to the above-described negative electrode roll 20.

Method of Producing Negative Electrode

The present invention provides a method of producing a negative electrode using the above-described device for producing a negative electrode.

As shown in FIG. 1, the method of producing a negative electrode according to the present invention includes: fabricating the above-described device for producing a negative electrode; winding a negative electrode structure 10 around a negative electrode roll 20; impregnating the negative electrode structure 10 with a pre-lithiation solution 1D while unwinding the negative electrode structure 10 from the negative electrode roll 20 and moving the same through an impregnation section 1A; pre-lithiating the negative electrode structure 10 while moving the negative electrode structure 10 from the impregnation section 1A through a pre-lithiation section 1B; and aging the negative electrode structure 10 while moving the negative electrode structure 10 from the pre-lithiation section 1B through an aging section 1C, wherein the pre-lithiation is performed by placing a lithium metal counter electrode 40, which is spaced apart from the negative electrode structure 10 and impregnated with the pre-lithiation solution 1D, in the pre-lithiation section 1B and electrochemically charging the negative electrode structure 10, and the negative electrode structure 10 moves through the impregnation section 1A, the pre-lithiation section 1B, and the aging section 1C by the above-described pre-lithiation roll 30.

According to the method of producing a negative electrode of the present invention, the negative electrode structure moves in the pre-lithiation solution of the pre-lithiation bath by the pre-lithiation roll having an outer ring including a non-conductor. Accordingly, the current applied to the negative electrode structure when pre-lithiation is performed by electrochemical charging may not be consumed externally or wasted through the roll structure. Therefore, low process loss in the pre-lithiation by electrochemical charging is achieved, the negative electrode structure is uniformly and stably pre-lithiated, and the degree of pre-lithiation is easily controlled. Therefore, since a negative electrode produced using the device for producing a negative electrode according to the present invention is uniformly and stably pre-lithiated, battery characteristics such as lifetime characteristics and the like can be improved.

In addition, according to the method of producing a negative electrode of the present invention, since a negative electrode is pre-lithiated in a roll-to-roll manner, quality consistency of a product and processability can be improved.

The method of producing a negative electrode according to the present invention includes fabricating the above-described device for producing a negative electrode. The configuration and form of the device for producing a negative electrode have been described above.

Referring to FIG. 1, the method of producing a negative electrode according to the present invention includes winding a negative electrode structure 10 on a negative electrode roll 20.

The negative electrode structure 10 includes a negative electrode current collector and a negative electrode active material layer formed on at least one surface of the negative electrode current collector.

The negative electrode current collector is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector may typically have a thickness of 3 to 500 μm.

The negative electrode current collector may have fine irregularities formed on a surface thereof to increase the adhesion of a negative electrode active material. In addition, the negative electrode current collector may be used in any of various forms such as a film, a sheet, a foil, a net, a porous material, a foam, a non-woven fabric, and the like.

The negative electrode active material layer is formed on at least one surface of the negative electrode current collector. Specifically, the negative electrode active material layer may be formed on one surface or both surfaces of the negative electrode current collector and is preferably formed on both surfaces of the negative electrode current collector in view of the utilization of the negative electrode active material and the improvement of cell energy density.

The negative electrode active material layer includes a negative electrode active material.

The negative electrode active material may include at least one selected from the group consisting of a carbon-based active material and a silicon-based active material.

The silicon-based active material may impart excellent capacity characteristics and excellent durability to the negative electrode for a secondary battery or the secondary battery of the present invention.

The silicon-based active material may include a compound represented by $SiO_x$ ($0 \le x \le 2$). Since Sift does not react with lithium ions, it is not possible to store lithium. Therefore, it is preferable that x is within the above-described range, and the silicon-based oxide is more preferably SiO.

The silicon-based active material may have an average particle diameter ($D_{50}$) of 1 μm to 30 μm, and preferably, 3 μm to 15 μm in view of ensuring structural stability and reducing side reactions with an electrolyte during charging and discharging.

The carbon-based active material may impart excellent cycle characteristics or excellent battery lifetime characteristics to the negative electrode for a secondary battery or the secondary battery of the present invention.

Specifically, the carbon-based active material may include at least one selected from the group consisting of artificial graphite, natural graphite, hard carbon, soft carbon, carbon black, acetylene black, Ketjen black, Super P, graphene, and fibrous carbon and preferably includes at least one selected from the group consisting of artificial graphite and natural graphite.

The carbon-based active material may have an average particle diameter ($D_{50}$) of 10 μm to 30 μm, and preferably, 15 μm to 25 μm in view of ensuring structural stability and reducing side reactions with an electrolyte during charging and discharging.

Specifically, the negative electrode active material preferably includes both the silicon-based active material and the carbon-based active material in view of improving both capacity characteristics and cycle characteristics. More specifically, the negative electrode active material preferably includes the carbon-based active material and the silicon-based active material in a weight ratio of 50:50 to 95:5, and more preferably, in a weight ratio of 60:40 to 80:20. It is preferable that the weight ratio of the carbon-based active material and the silicon-based active material is within the above-described range in view of improving both capacity characteristics and cycle characteristics.

The negative electrode active material may be included at 60 wt % to 99 wt %, and preferably, 75 wt % to 95 wt % with respect to the total weight of the negative electrode active material layer in the negative electrode active material layer.

The negative electrode active material layer may further include a binder and/or a conductive material in addition to the negative electrode active material.

The negative electrode active material layer may further include a binder and/or a conductive material in addition to the negative electrode active material.

The binder is used to improve adhesion between the negative electrode active material layer and the negative electrode current collector to accordingly improve battery performance. The binder may include, for example, at least one selected from the group consisting of a polyvinylidene fluoride-hexafluoropropylene copolymer (PVDF-co-HFP), polyvinylidene fluoride (PVDF), polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluorine rubber, polymers in which hydrogens thereof have been substituted with Li, Na, Ca, or the like, and various copolymers thereof.

The binder may be included at 0.5 wt % to 10 wt %, and preferably, 1 wt % to 5 wt % with respect to the total weight of the negative electrode active material layer in the negative electrode active material layer.

The conductive material is not particularly limited as long as it does not cause a chemical change in the produced battery and has conductivity. As the conductive material, graphite such as natural graphite, artificial graphite, or the like; carbon black such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon powder; a metal powder such as aluminum powder, nickel powder, or the like; a conductive whisker consisting of zinc oxide, potassium titanate, or the like; a conductive metal oxide such as titanium oxide or the like; or a conductive material such as a polyphenylene derivative or the like may be used.

The conductive material may be included at 0.5 wt % to 10 wt %, and preferably, 1 wt % to 5 wt % with respect to the total weight of the negative electrode active material layer in the negative electrode active material layer.

The negative electrode active material layer may have a thickness of 10 μm to 100 μm, and preferably, 50 μm to 80 μm.

Referring to FIG. 1, the method of producing a negative electrode according to the present invention includes impregnating the negative electrode structure 10 with a pre-lithiation solution 1D while unwinding the negative electrode structure 10 from the negative electrode roll 20 and moving the same through an impregnation section 1A.

The negative electrode structure 10 unwound from the negative electrode roll 20 is introduced into the pre-lithiation bath and moves through the impregnation section. Specifically, as shown in FIG. 1, the negative electrode structure 10 unwound from the negative electrode roll 20 may move through the impregnation section 1A along pre-lithiation rolls 30a, 30b.

As the negative electrode structure 10 moves through the impregnation section 1A, electrolyte impregnation is achieved by the pre-lithiation solution 1D contained in the impregnation section 1A. Due to the electrolyte impregnation, lithium ions may be more smoothly intercalated in the pre-lithiation of the negative electrode structure 10.

The time taken for the negative electrode structure 10 to move through the impregnation section 1A is 1 times to 10 times, more preferably, 1.5 times to 5 times the time taken for the negative electrode structure 10 to move through a pre-lithiation section 1B to be described below. When the time is within the above-described range, it is possible to form a more uniform passivation film in pre-lithiation to be described below and perform pre-lithiation.

Referring to FIG. 1, the method of producing a negative electrode according to the present invention includes pre-lithiating the negative electrode structure 10 while introducing the negative electrode structure 10 from the impregnation section 1A and moving the same through a pre-lithiation section 1B.

The negative electrode structure 10 passes through the impregnation section 1A and enters the pre-lithiation section 1B. In the pre-lithiation section 1B, the negative electrode structure 10 is pre-lithiated, and lithium ions are intercalated into the negative electrode active material layer or negative electrode active material. Accordingly, the irreversible capacity of the negative electrode active material is removed, and a passivation film is formed.

The pre-lithiation is performed while the negative electrode structure 10 moves through the pre-lithiation section 1B.

The time taken for the negative electrode structure 10 to move through the pre-lithiation section 1B may range from 5 minutes to 120 minutes, preferably 10 minutes to 90 minutes, and more preferably 15 minutes to 40 minutes. It is preferable that the time is within the above-described range so that it is possible to more uniformly pre-lithiate the negative electrode active material and prevent an increase in by-products in a negative electrode due to excessive pre-lithiation.

The pre-lithiation is performed by disposing a lithium metal counter electrode 40, which is spaced apart from the negative electrode structure 10 and impregnated with the pre-lithiation solution 1D, in the pre-lithiation section 1B and electrochemically charging the negative electrode structure 10.

When a conventional pre-lithiation method, in which a lithium metal and a negative electrode structure are in direct contact, is applied in a roll-to-roll process, both a negative electrode structure and a lithium metal need to be wound on a negative electrode roll. In this case, it is not possible to adjust an intercalation rate of lithium ions in the electrolyte impregnation or aging process, and thus a negative electrode active material may be damaged, causing the lifetime characteristics of the negative electrode active material to be degraded. When a process of contacting a lithium metal with a negative electrode structure and compressing them is separately performed without winding both a negative electrode structure and a lithium metal on a negative electrode roll, it is not possible to perform electrolyte impregnation, pre-lithiation, and aging processes at one time as in the present invention, and thus there is high inconvenience in the process.

However, the method of producing a negative electrode according to the present invention makes it possible to adjust an intercalation rate of lithium ions and prevent volume expansion of or damage to a negative electrode active material due to excessive lithium intercalation by performing pre-lithiation by an electrochemical charging method using a lithium metal spaced apart from the negative electrode structure as a counter electrode, as compared with the conventional method in which a negative electrode structure and a lithium metal are in direct contact.

In addition, according to the method of producing a negative electrode of the present invention, since the outer ring of the pre-lithiation roll 30, which is used to convey the negative electrode structure, includes a non-conductor, the current applied to the negative electrode structure when pre-lithiation is performed by electrochemical charging may not be consumed externally through the outer ring but may be mainly used in the pre-lithiation of the negative electrode structure or the intercalation of lithium. Therefore, the method of producing a negative electrode according to the present invention achieves remarkably low process loss in the electrochemical charging and allows the negative electrode structure to be uniformly and stably pre-lithiated, resulting in improvement of lifetime characteristics of the produced negative electrode.

The electrochemical charging may be performed by an oxidation-reduction reaction using an electrochemical charging/discharging device.

Lithium metal counter electrodes 40a, 40b may function as a counter electrode for the negative electrode structure 10. The lithium metal counter electrodes 40a, 40b are spaced apart from the negative electrode structure 10 in the pre-lithiation bath 1 to prevent an electrical short circuit with the negative electrode structure 10 during the electrochemical charging.

The pre-lithiation may be performed at a current density of 0.2 mA/cm$^2$ to 10 mA/cm$^2$, and preferably, 2 mA/cm$^2$ to 6 mA/cm$^2$. When the electrochemical charging is performed at a current density within the above-described range, the negative electrode active material can be stably and uniformly pre-lithiated.

The pre-lithiation may be performed by electrochemical charging to 5 to 50%, preferably, 15 to 35% of the state of charge (SoC) of the negative electrode structure. It is preferable that the pre-lithiation is performed by electrochemical charging to the above-described range so that a passivation film can be uniformly and stably formed on the surface of the negative electrode structure, and thus the reversible capacity of a battery can be improved, resulting in improvement of cycle characteristics of the battery.

The method of producing a negative electrode according to the present invention includes aging the negative electrode structure 10 while introducing the negative electrode structure 10 from the pre-lithiation section 1B and moving the same through an aging section 1C.

After the negative electrode structure 10 passes through the pre-lithiation section 1B, the negative electrode structure enters the aging section 1C.

As the pre-lithiated negative electrode structure moves through the aging section 1C containing the pre-lithiation solution 1D, lithium ions intercalated by the pre-lithiation may be more uniformly diffused on the surface and in the inside of the negative electrode active material. When the aging process is not performed after the pre-lithiation, lithium ions are not uniformly diffused into the negative electrode active material, and thus it may be difficult to sufficiently remove the irreversible capacity even though the pre-lithiation has been performed, and charging and discharging may not uniformly occur after a negative electrode is produced.

The time taken for the negative electrode structure 10 to move through the aging section 1C is 0.5 times to 21 times, preferably, 1.8 times to 10 times the time taken for the negative electrode structure 10 to move through the pre-lithiation section 1B. It is preferable that the time is within the above-described range so that lithium ions can be more uniformly diffused into the negative electrode active material, and detachment of the negative electrode active material layer from the current collector due to excessive aging or an increase in resistance due to an increase in thickness of a surface coating of a negative electrode can be prevented.

The method of producing a negative electrode according to the present invention may further include washing the negative electrode structure 10 by taking the negative electrode structure 10 out of the pre-lithiation bath 1, introducing the negative electrode structure into a washing bath 2 containing an organic solvent, and moving the same through the washing bath 2.

Since the method of producing a negative electrode according to the present invention further includes the washing process after the pre-lithiation and aging of the negative electrode structure 10, impurities remaining in the negative electrode structure may be removed.

The washing process may be performed by taking the negative electrode structure 10 out of the pre-lithiation bath 1 and introducing the same into the separately arranged washing bath 2.

The washing process may be performed by discharging the negative electrode structure 10 from the pre-lithiation bath 1 and introducing the same into the washing bath 2 through a first conveying roll 50 disposed between the pre-lithiation bath 1 and the washing bath 2, and the negative electrode structure 10 may be washed while moving in the washing bath 2.

The movement of the negative electrode structure 10 in the washing bath 2 may be performed by at least one separately arranged washing roll 60. The washing roll 60 may be disposed inside the organic solvent and allow the negative electrode structure 10 conveyed to the washing bath 2 to move in the washing bath.

The washing bath 2 contains the organic solvent, specifically, the organic solvent not containing a lithium salt. The aged negative electrode structure is washed while moving in the solution not containing a lithium salt. As the organic solvent, the organic solvent listed in the description of the pre-lithiation solution may be used.

The time taken for the negative electrode structure 10 to move through the washing bath 2 is 0.1 times to 5 times, more preferably, 0.5 times to 2 times the time taken for the negative electrode structure 10 to move through the pre-lithiation section 1B. When the time is within the above-described range, impurities remaining in the negative electrode structure can be smoothly removed.

Details of the washing bath 2, the organic solvent, the first conveying roll 50, and the washing roll 60 have been described above.

The method of producing a negative electrode according to the present invention may further include drying the washed negative electrode structure 10.

Through the drying process, the organic solvent remaining in the negative electrode structure after the impregnation, pre-lithiation, aging, and/or washing processes may be removed.

Specifically, the drying process may be performed by taking the washed negative electrode structure 10 out of the washing bath 2 and introducing the same into a separately arranged drying part 3. A second conveying roll 70 may be disposed between the washing bath 2 and the drying part 3, and the negative electrode structure 10 may move in the drying part 3 by the second conveying roll 70.

The drying process may be performed by air or an inert gas. The inert gas may be at least one selected from the group consisting of Ar, $N_2$, and He.

The drying process may be performed at 10° C. to 80° C., preferably 20° C. to 60° C., and more preferably 25° C. to 40° C. It is preferable that the drying process is performed at a temperature within the above-described range so that the negative electrode structure can be prevented from being oxidized and maintained in the pre-lithiated state.

The time taken to dry the washed negative electrode structure 10 may be 0.1 times to 5 times, and preferably, 0.5 times to 2 times the time taken for the negative electrode structure 10 to move through the pre-lithiation section. It is preferable that the time is within the above-described range so that the organic solvent remaining in the negative electrode structure can be smoothly removed, and damage to the negative electrode structure which may be caused by the organic solvent remaining in the negative electrode structure for a long time can be prevented.

In the drying part 3, a collecting roll 80 may be installed, and the negative electrode structure 10 that has moved through the drying part 3 may be wound on the collecting roll 80.

Details of the drying part 3, the second conveying roll 70, and the collecting roll 80 have been described above.

The method of producing a negative electrode according to the present invention may further include producing a negative electrode by unwinding the negative electrode structure 10 from the collecting roll 80 and cutting the same.

The negative electrode may be assembled with a positive electrode, a separator, an electrolyte, and the like as described below, and accordingly, a secondary battery, specifically a lithium secondary battery, may be produced.

A negative electrode produced by the above-described method has improved reversibility, improved initial efficiency, and improved lifetime characteristics because uniform and stable pre-lithiation is possible. Accordingly, the negative electrode produced by the method of the present invention is preferably applied to a secondary battery, specifically, a lithium secondary battery.

The secondary battery may include the negative electrode for a secondary battery which is produced by the above-described method, a positive electrode disposed to face the negative electrode for a secondary battery, a separator interposed between the negative electrode for a secondary battery and the positive electrode, and an electrolyte. Details of the negative electrode for a secondary battery have been described above, and the positive electrode, separator, and electrolyte may be used without limitation as long as they are typically used in a lithium secondary battery.

The secondary battery is useful in the field of portable devices, such as mobile phones, notebook computers, digital cameras, and the like, and electric vehicles such as hybrid electric vehicles (HEVs).

In addition, the secondary battery may be applied to a battery module including the secondary battery as a unit cell or a battery pack including the battery module.

The battery module or battery pack may be used as a power source of one or more medium-to-large-sized devices selected from a power tool; electric vehicles (EVs), hybrid electric vehicles, and plug-in hybrid electric vehicles (PHEVs); and a system for storing electric power.

Hereinafter, the present invention will be described in detail with reference to Examples so that those skilled in the art can easily carry out the present invention. However, the present invention may be embodied in several different forms, and therefore, is not limited to Examples described herein.

EXAMPLES

Example 1: Production of Negative Electrode

Fabrication of Device for Producing Negative Electrode

A pre-lithiation bath made of stainless steel and having a width, length, and height of 100 cm×20 cm×50 cm was provided. A pre-lithiation solution was added to the pre-lithiation bath so that the pre-lithiation solution was filled to 20% of the height of the pre-lithiation bath. The pre-lithiation bath was maintained at a temperature of 25° C.

The pre-lithiation solution was prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

The pre-lithiation bath was divided into an impregnation section, a pre-lithiation section, and an aging section. In the pre-lithiation solution of the pre-lithiation bath, two pre-lithiation rolls were installed respectively at the start point of the impregnation section and the end point of the aging section.

Outside the pre-lithiation solution, a negative electrode roll was installed.

In the pre-lithiation section, lithium metal counter electrodes were installed to be spaced apart from the movement path of a negative electrode structure.

In addition, the impregnation section, pre-lithiation section, and aging section in the pre-lithiation bath were partitioned in a length ratio of 2:1:2.

A washing bath made of stainless steel and having a width, length, and height of 20 cm×20 cm×50 cm was provided. A first conveying roll was installed between the pre-lithiation bath and the washing bath. The washing bath contained dimethyl carbonate (DMC) as an organic solvent so that DMC was filled to 20% of the height of the washing bath.

In the organic solvent of the washing bath, two washing rolls were installed respectively at the start point and end point of the washing bath.

A drying part made of stainless steel and having a width, length, and height of 20 cm×20 cm×50 cm was provided. A temperature of the drying part was 25° C., and the drying part was filled with air. A second conveying roll was installed between the washing bath and the drying part. A collecting roll was installed at the end point of the drying part.

As the negative electrode roll and the collecting roll, a roll including a drive shaft made of stainless steel and having a diameter of 6.5 cm and a winding portion formed of polysiloxane (silicone) on the drive shaft and having a thickness of 0.5 cm was used. The drive shafts of the negative electrode roll and the collecting roll were connected to an electric motor capable of rotating the drive shafts. The negative electrode roll and the collecting roll had a diameter of 7 cm and a width of 20 cm.

As the pre-lithiation roll, the washing roll, the first conveying roll, and the second conveying roll, a roll including an inner ring made of stainless steel and having a thickness of 0.5 cm, an outer ring made of polyether ether ketone (PEEK) and having a thickness of 0.5 cm, a rolling element made of stainless steel and disposed between the inner ring and the outer ring, and a cage accommodating the rolling element was provided. The pre-lithiation roll, the washing roll, the first conveying roll, and the second conveying roll had a diameter of 5 cm and a width of 20 cm. The inner rings of the pre-lithiation roll, the washing roll, the first conveying roll, and the second conveying roll were fixedly disposed, and the rolls were installed so that the outer ring is rotated by rotating and operating the rolling element.

Production of Negative Electrode (1) Fabrication of Negative Electrode Structure A negative electrode active material was prepared by mixing natural graphite (average particle diameter ($D_{50}$): 20 μm) and SiO (average particle diameter ($D_{50}$): 5 μm) in a weight ratio of 70:30.

The negative electrode active material, Denka black as a conductive material, styrene butadiene rubber (SBR) as a binder, and carboxymethylcellulose (CMC) as a thickener were mixed in a weight ratio of 92:3:3.5:1, thereby preparing a negative electrode slurry.

The negative electrode slurry was applied onto both surfaces of a copper current collector (thickness: 8 μm), and the resulting copper current collector was roll-pressed and dried in a 130° C. vacuum oven for 12 hours to form a negative electrode active material layer (thickness: 70 μm) on both surfaces of the copper negative electrode current collector, thereby fabricating a negative electrode structure.

The negative electrode structure was wound on the negative electrode roll.

(2) Impregnation, Pre-Lithiation, and Aging of Negative Electrode Structure

The negative electrode structure was introduced into and moved through the pre-lithiation bath at a speed of 1 cm/min while being unwound from the negative electrode roll.

The unwound negative electrode structure entered the impregnation section and was moved therethrough for 40 minutes, thereby impregnating the negative electrode structure with an electrolyte solution.

The negative electrode structure having passed through the impregnation section entered the pre-lithiation section and was moved therethrough for 20 minutes, thereby pre-lithiating the negative electrode structure. Specifically, the negative electrode structure was pre-lithiated by electrochemically charging the negative electrode structure and the lithium metal counter electrodes spaced apart from the negative electrode structure to 18.5% SoC of the negative electrode structure at a current density of 4.68 mA/cm² using an electrochemical charging/discharging device (WBCS3000 manufactured by WonATech).

The negative electrode structure having passed through the pre-lithiation section entered the aging section and was moved therethrough for 40 minutes, thereby aging the negative electrode structure.

(3) Washing and Drying of Negative Electrode Structure

The aged negative electrode structure was taken out of the pre-lithiation bath and introduced into the washing bath through the first conveying roll. Also, the negative electrode structure was washed while moving in the washing bath through the two washing rolls. The time taken for the negative electrode structure to move in the washing bath was 20 minutes.

The washed negative electrode structure was conveyed from the washing bath to the drying part through the second conveying roll. The negative electrode structure was dried for 20 minutes while moving in the drying part. The negative electrode structure was collected while being wound on the collecting roll.

Example 2: Production of Negative Electrode

A negative electrode of Example 2 was produced in the same manner using the same device as in Example 1 except that an outer ring of the pre-lithiation roll was made of polytetrafluoroethylene (PTFE, Teflon).

Example 3: Production of Negative Electrode

A negative electrode of Example 3 was produced in the same manner using the same device as in Example 1 except that an outer ring of the pre-lithiation roll was made of polypropylene (PP).

Example 4: Production of Negative Electrode

A negative electrode of Example 4 was produced in the same manner using the same device as in Example 1 except that an outer ring of the pre-lithiation roll was made of $ZrO_2$.

Example 5: Production of Negative Electrode

A negative electrode of Example 5 was produced in the same manner using the same device as in Example 1 except that an outer ring of the pre-lithiation roll had a thickness of 0.3 cm.

Example 6: Production of Negative Electrode

A negative electrode of Example 6 was produced in the same manner using the same device as in Example 1 except that an outer ring of the pre-lithiation roll had a thickness of 0.8 cm.

COMPARATIVE EXAMPLES

Comparative Example 1: Production of Negative Electrode

A negative electrode of Comparative Example 1 was produced in the same manner using the same device as in Example 1 except that an outer ring of the pre-lithiation roll was made of stainless steel.

Comparative Example 2: Production of Negative Electrode

A negative electrode of Comparative Example 2 was produced in the same manner using the same device as in Example 1 except that an outer ring of the pre-lithiation roll was made of iron.

Experimental Example 1: Evaluation of Initial Efficiency

Production of Half-Cell Secondary Battery

The negative electrodes produced in Examples 1 to 6 and Comparative Examples 1 and 2 were cut into an area of 1.4875 cm².

The negative electrode for a secondary battery according to each of Examples 1 to 6 and Comparative Examples 1 and 2 and a lithium metal counter electrode as a positive electrode were provided, a polypropylene separator was interposed between the negative electrode and the positive electrode, and an electrolyte was injected, thereby producing a half-cell lithium secondary battery. The electrolyte was prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

Evaluation of Initial Efficiency

The initial efficiency was evaluated by charging the battery while applying current at a current density of 0.1 C-rate up to 0.005 V (vs. Li/Li+) and discharging the battery at the same current density up to 1.5 V (vs. Li/Li+).

Equation 1

Initial efficiency (%)=(Discharge capacity at $1^{st}$ cycle/Charge capacity at $1^{st}$ cycle)×100

TABLE 1

|  | Initial charge capacity (mAh/g) | Initial discharge capacity (mAh/g) | Initial efficiency (%) |
|---|---|---|---|
| Example 1 | 731 | 717 | 98.1 |
| Example 2 | 734 | 716 | 97.5 |
| Example 3 | 735 | 717 | 97.6 |
| Example 4 | 735 | 716 | 97.4 |
| Example 5 | 734 | 716 | 97.5 |
| Example 6 | 733 | 713 | 97.3 |
| Comparative Example 1 | 838 | 715 | 85.3 |
| Comparative Example 2 | 844 | 714 | 84.6 |

Referring to Table 1, it can be seen that the negative electrodes of Examples 1 to 6, which were produced using a pre-lithiation roll including an outer ring which was a non-conductor, were able to be more smoothly and uniformly pre-lithiated, and thus high levels of initial efficiency were exhibited compared to the negative electrodes of Comparative Examples 1 and 2, which were not produced using a pre-lithiation roll including an outer ring which was a non-conductor.

Experimental Example 2: Evaluation of Capacity Retention Rate

Production of Full-Cell Secondary Battery

The negative electrodes produced in Examples 1 to 6 and Comparative Examples 1 and 2 were cut into a size of 3 cm×4 cm.

$LiNi_{0.8}Co_{0.1}Mn_{0.1}O_2$ as a positive electrode active material, Super C as a conductive material, and polyvinylidene fluoride (PVDF) as a binder were mixed in a weight ratio of 97:1.5:1.5 to prepare a positive electrode slurry, the positive electrode slurry was applied onto an aluminum current collector, and the resulting aluminum current collector was roll-pressed and dried at 130° C., thereby producing a positive electrode.

A polypropylene separator was interposed between the negative electrode according to each of Examples 1 to 6 and Comparative Examples 1 and 2 and the above-produced positive electrode, and an electrolyte was injected, thereby producing a lithium secondary battery. The electrolyte was prepared by adding $LiPF_6$ as a lithium salt at a concentration of 1 M to an organic solvent in which EC and EMC were mixed in a volume ratio of 30:70 and adding FEC as an additive at 2 wt % with respect to the total weight of the pre-lithiation solution.

Evaluation of Capacity Retention Rate

The discharge capacity and capacity retention rate of the lithium secondary batteries according to Examples 1 to 6 and Comparative Examples 1 and 2 were evaluated using an electrochemical charging/discharging device. In this case, the lithium secondary batteries were charged while applying current at a current density of 0.1 C-rate up to 4.2 V and discharged at the same current density up to 2.5 V.

The capacity retention rate was evaluated by measuring the discharge capacities of the lithium secondary batteries according to Examples 1 to 6 and Comparative Examples 1 and 2 at $1s^t$ and $100^{th}$ cycles and substituting the resulting values into the following Equation 2, and results thereof are shown in the Table 2 below.

Equation 2

Capacity retention rate (%)=(Discharge capacity at $100^{th}$ cycle)/(Discharge capacity at $1^{st}$ cycle)×100

TABLE 2

|  | Capacity retention rate (%) @ $100^{th}$ cycle |
|---|---|
| Example 1 | 94 |
| Example 2 | 93 |
| Example 3 | 93 |
| Example 4 | 93 |
| Example 5 | 92 |
| Example 6 | 93 |
| Comparative Example 1 | 82 |
| Comparative Example 2 | 81 |

Referring to Table 2, it can be seen that the negative electrodes of Examples 1 to 6, which were produced using a pre-lithiation roll including an outer ring which was a non-conductor, were able to be more smoothly and uniformly pre-lithiated, and thus high levels of cycle life characteristics were exhibited compared to the negative electrodes of Comparative Examples 1 and 2, which were not produced using a pre-lithiation roll including an outer ring which was a non-conductor.

LIST OF REFERENCE NUMERALS

1: pre-lithiation bath
1A: impregnation section
1B: pre-lithiation section
1C: aging section
1D: pre-lithiation solution
2: washing bath
3: drying part
10: negative electrode structure
20: negative electrode roll
21: drive shaft
22: winding portion 30, 30a, 30b: pre-lithiation roll
31: inner ring
32: outer ring
33: rolling element
34: cage
40, 40a, 40b: lithium metal counter electrode
50: first conveying roll
60, 60a, 60b: washing roll
70: second conveying roll
80: collecting roll

The invention claimed is:

1. A device for producing a negative electrode, comprising:
a pre-lithiation bath comprising a pre-lithiation solution, which is sequentially divided into an impregnation section, a pre-lithiation section, and an aging section;
a negative electrode roll present outside the pre-lithiation solution, wherein the negative electrode roll is configured to allow a negative electrode structure to be wound and unwound; and
one or more pre-lithiation rolls which are present inside the pre-lithiation solution, wherein the one or more pre-lithiation rolls allow the negative electrode structure unwound from the negative electrode roll to move in the pre-lithiation bath,
wherein the pre-lithiation roll comprises an inner ring, an outer ring which is formed on the inner ring and is rotatable, a rolling element present between the inner ring and the outer ring, the rolling element directly contacting the inner ring and the outer ring, and a cage between the inner ring and the outer ring and accommodating the rolling element,
wherein the outer ring in the pre-lithiation roll comprises a non-conductor, and
wherein the outer ring forms an exterior surface of the pre-lithiation roll, the exterior surface configured to contact the negative electrode structure.

2. The device of claim 1, wherein the non-conductor comprises one or more selected from the group consisting of a ceramic compound and a non-conductive polymer.

3. The device of claim 2, wherein the ceramic compound is one or more metal oxide, wherein the metal is selected from the group consisting of silicon (Si), aluminum (Al), titanium (Ti), zirconium (Zr), calcium (Ca), magnesium (Mg), yttrium (Y), and cerium (Ce).

4. The device of claim 2, wherein the non-conductive polymer is one or more selected from the group consisting of polytetrafluoroethylene, polyethylene, polypropylene, polyvinyl chloride, and polyether ether ketone.

5. The device of claim 1, wherein the outer ring has a thickness of 0.2 cm to 1 cm.

6. The device of claim 1, wherein the inner ring comprises one or more selected from the group consisting of iron, stainless steel, aluminum, and copper.

7. The device of claim 1, wherein the negative electrode roll comprises:
a rotatable drive shaft; and
a winding portion formed on the rotatable drive shaft and on which the negative electrode structure is wound, and from which the negative electrode structure is unwound,
wherein the winding portion comprises a non-conductor.

8. The device of claim 1, further comprising:
a washing bath comprising an organic solvent;
a first conveying roll present between the pre-lithiation bath and the washing bath, wherein the first conveying roll allows the negative electrode structure to be conveyed from the pre-lithiation bath to the washing bath; and
one or more washing rolls present inside the organic solvent, wherein the one or more washing rolls allow the negative electrode structure conveyed to the washing bath to move in the washing bath.

9. The device of claim 8, further comprising:
a drying part;
a second conveying roll present between the washing bath and the drying part, wherein the second conveying roll allows the negative electrode structure to be conveyed from the washing bath to the drying part and move in the drying part; and
a collecting roll which allows the negative electrode structure conveyed to the drying part to be wound and unwound.

10. A method of producing a negative electrode, comprising:
providing the device for producing the negative electrode according to claim 1;
winding the negative electrode structure around the negative electrode roll;
impregnating the negative electrode structure with the pre-lithiation solution while unwinding the negative electrode structure from the negative electrode roll and moving the negative electrode structure through the impregnation section;
pre-lithiating the negative electrode structure while moving the negative electrode structure from the impregnation section through the pre-lithiation section; and
aging the negative electrode structure while moving the negative electrode structure from the pre-lithiation section through the aging section,
wherein the pre-lithiation is performed by placing a lithium metal counter electrode, which is spaced apart from the negative electrode structure and impregnated with the pre-lithiation solution, in the pre-lithiation section and electrochemically charging the negative electrode structure, and
the negative electrode structure moves through the impregnation section, the pre-lithiation section, and the aging section by the pre-lithiation roll.

11. The method of claim 10, wherein a time for the negative electrode structure to move through the pre-lithiation section ranges from 5 minutes to 120 minutes.

12. The method of claim 10, wherein a time for the negative electrode structure to move through the aging section is 0.5 times to 21 times a time for the negative electrode structure to move through the pre-lithiation section.

13. The method of claim 10, wherein a time for the negative electrode structure to move through the impregnation section is 1 times to 10 times a time for the negative electrode structure to move through the pre-lithiation section.

14. The method of claim 10, further comprising washing the negative electrode structure by taking the negative electrode structure out of the pre-lithiation bath, introducing the negative electrode structure into a washing bath comprising an organic solvent, and moving the negative electrode structure through the washing bath.

15. The method of claim 14, further comprising drying the washed negative electrode structure.

* * * * *